United States Patent [19]

Ross

[11] Patent Number: 4,763,813
[45] Date of Patent: Aug. 16, 1988

[54] OIL METERING APPARATUS

[76] Inventor: Charles R. Ross, 711 Taladega St., W. Palm Beach, Fla. 33401

[21] Appl. No.: 927,800

[22] Filed: Nov. 5, 1986

[51] Int. Cl.$^4$ .......... B67D 5/22; B67D 7/12; B67D 5/06; G01F 11/28
[52] U.S. Cl. ............ 222/50; 222/438; 222/434; 222/522; 222/181
[58] Field of Search ........ 222/40, 47, 48, 49, 222/50, 519, 520, 522, 524, 525, 526, 527, 529, 461, 181, 185, 434, 440, 438, 155, 528; 248/311.2, 318; 296/1 C

[56] References Cited

U.S. PATENT DOCUMENTS

| 1,594,535 | 8/1926 | Lindbeck | 248/311.2 X |
| 3,132,768 | 5/1964 | Orr | 222/461 |
| 3,184,107 | 5/1965 | Kohanzo | 222/49 |
| 3,229,678 | 1/1966 | Anspach | 222/155 |

Primary Examiner—H. Grant Skaggs
Assistant Examiner—Lisa C. Waag
Attorney, Agent, or Firm—Steele, Gould & Fried

[57] ABSTRACT

An oil metering apparatus is disclosed which will provide a ready supply of oil to a vehicle whenever necessary. The apparatus includes an oil reservoir and adjustable outlet structure which is positionable in the reservoir to release oil from the reservoir. Metering structure is preferably provided to measure the amount of oil that is released. Tube structure transfers oil released through the outlet structure directly to the engine. Locking structure can be provided to retain the outlet at a selected position within the reservoir. Structure can also be provided to suspend the apparatus from the hood of the vehicle.

15 Claims, 3 Drawing Sheets

OIL METERING APPARATUS

BACKGROUND OF THE INVENTION

1. Field of the Invention

This invention relates generally to motor vehicle apparatus, and more particularly to apparatus for supplying oil to a motor vehicle.

2. DESCRIPTION OF THE PRIOR ART

Severe damage to the engine can result if the oil level runs too low. A recurring problem in the maintenance of motor vehicles is in having a ready supply of motor oil at hand. It is not always possible to purchase the oil when it is needed, especially when travelling. The problem becomes especially acute when the motor is defective and regularly requires oil.

Adding oil to an engine is often a messy procedure. Oil drops and spills are almost inevitable, and grease on the engine is difficult to avoid. It is especially undesirable when one is not dressed properly to work on the motor vehicle.

It would be desirable to provide an apparatus which not only would keep a supply of oil with the vehicle, but which also could be used to supply the oil directly to the engine when necessary. It further would be desirable if the apparatus was capable of metering a desired amount of oil to the engine.

SUMMARY OF THE INVENTION

It is an object of the invention to provide an oil metering apparatus which will store a ready reserve of oil for a motor vehicle.

It is another object of the invention to provide an apparatus which can be used to meter a proper amount of oil to the engine whenever necessary.

It is still another object of the invention to provide an apparatus which will cleanly store and dispense the oil to the engine with a minimum of drops and spills.

It is another object of the invention to provide an apparatus which can be conveniently housed adjacent the engine.

These and other objects are accomplished by an oil metering apparatus with an oil reservoir. Outlet structure is provided with the reservoir and is selectively positionable to dispense oil from the reservoir. The outlet structure preferably includes metering means for measuring the amount of oil that is released. Locking structure can be provided to retain the outlet structure at the selected position within the reservoir. The outlet structure is preferably recloseable to prevent leakage or spills. Oil dispensed through the outlet structure can be carried through tube structure directly to the engine.

The outlet structure includes a passage through the reservoir. The passage preferably is formed by a conduit member with a first opening capable of communicating with the interior of the reservoir and a second opening capable of communicating with the exterior of the reservoir. The first opening is positionable within the reservoir. Positioning of the first opening within the reservoir below the level of the oil will permit the oil to flow out of the reservoir through the conduit member and the second opening under the force of gravity.

Metering means permits the user to control the amount of oil which is released to the engine. The reservoir or outlet structure can be graduated such that the position of the first opening with respect to the oil level in the reservoir can be determined with precision. A measured amount of oil can then be released by positioning the first opening below the surface of the oil at a distance determined by the graduations on the reservoir or the outlet structure corresponding to the amount of oil that is desired. Graduations on the reservoir can also be used to indicate the amount of oil that remains in the reservoir. Other metering means are possible.

Valve means are preferably provided to prevent oil from the reservoir from leaking or spilling when the vehicle is in motion. A preferable valve structure according to the invention includes a housing for the conduit member. In a first position of the conduit member with respect to the housing, the first opening communicates with the interior of the reservoir and oil can pass through the conduit member to the engine. In a second position of the conduit member with respect to the housing, the first opening abuts a portion of the housing to prevent oil flow through the conduit member.

A preferable structure provides a tubular conduit member moveable with respect to the reservoir and a housing fixed to or fashioned from the reservoir. The conduit member and housing are nested snugly one inside the other. The conduit member is moveable with respect to the housing. In a preferred embodiment, the conduit member is nested within the housing and is slidably mounted through the reservoir and the housing. The conduit member is both radially pivotable and axially slidable with respect to the housing. In one radial position of the conduit member with respect to the housing, the first opening in the conduit member abuts a portion of the housing to prevent oil flow through the conduit member. In a second position of the conduit member with respect to the housing, the first opening in the conduit member aligns with at least one opening in the housing to permit oil flow out of the reservoir through the first opening and passage of the conduit member and through the second opening to the engine. The conduit member can be axially displaced downward in the housing to supply more oil to the engine. Seal structure can be provided to prevent oil from leaking between the conduit member and the reservoir.

It would alternatively be possible to nest the conduit member around the outside of the housing. The conduit member would remain axially and radially displaceable with respect to the housing. The first opening would be provided in the conduit member, and would be alignable with an opening in the housing to permit oil flow out of the reservoir through the housing. The second opening would be provided at the base of the housing, communicating with the exterior of the reservoir.

Locking structure can be provided to secure the conduit member in a desired position with respect to the housing. The locking structure can be a flip-up cam lock which causes a frictional locking effect between the conduit member and the housing. Other locking structure is possible.

Tube structure can be attached directly between the second opening and the engine so that oil is passed directly to the engine. The tube can be secured to the engine by a suitable cap designed to fit the oil-fill opening for the particular engine. The tube structure is preferably flexible to permit a range of movement for the reservoir with respect to the engine.

Structure can be provided to mount the reservoir adjacent the engine. The structure can be a frame which is adapted to retain the reservoir. The frame preferably attaches to the underside of the hood. The frame also preferably is adapted to allow the reservoir to drop to a horizontal position to compensate for the angled position of the opened hood, and to permit easy operation of the outlet structure. The reservoir can be secured out of the way in a position adjacent the hood by latch means when not in use.

BRIEF DESCRIPTION OF THE DRAWINGS

There are shown in the drawings embodiments which are presently preferred it being understood, however, that the invention is not limited to the precise instrumentalities and arrangements shown, wherein.

DETAILED DESCRIPTION OF THE PREFERRED EMBODIMENTS

Figure 1:
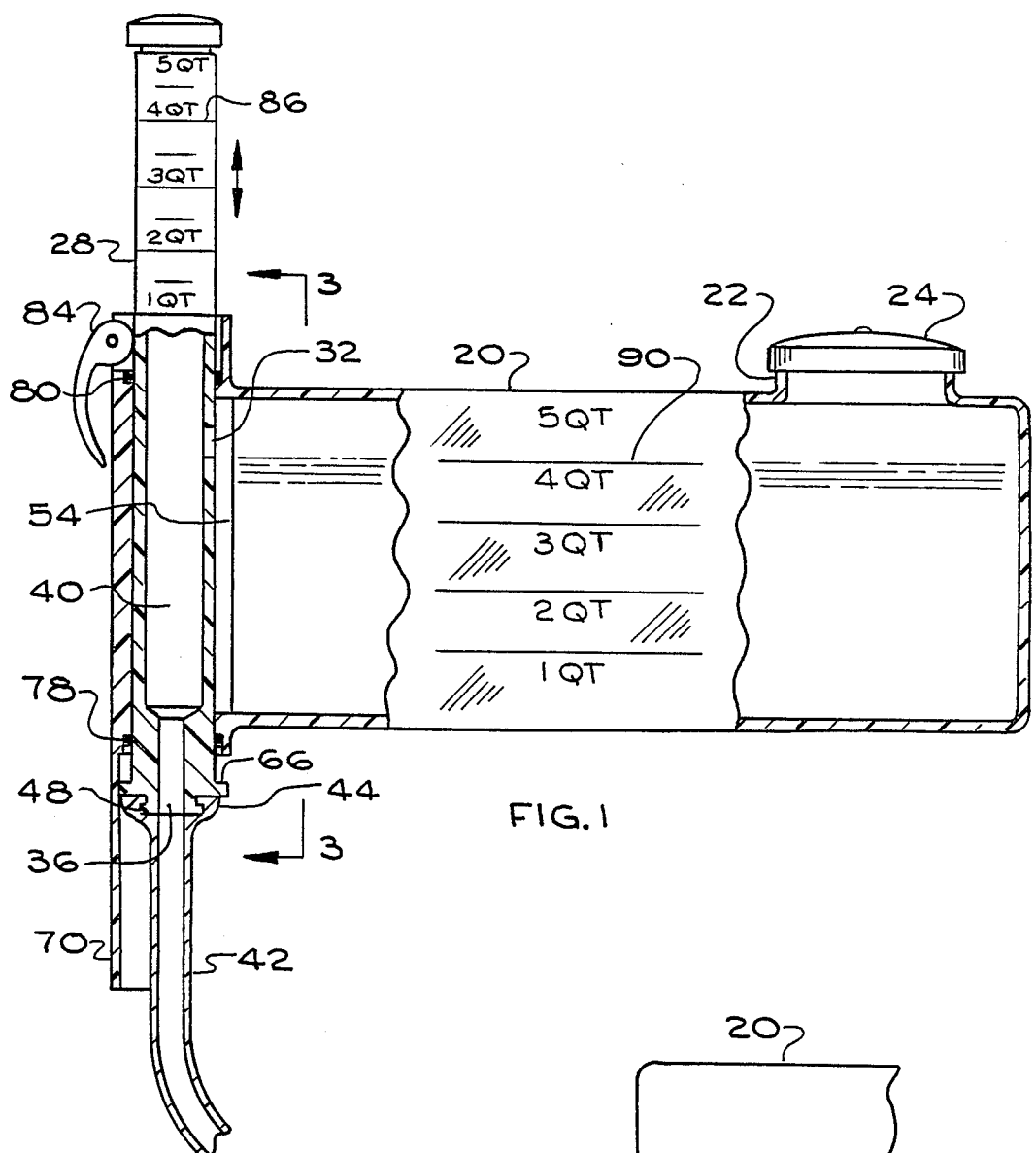
FIG. 1 is a side elevation, partially broken away, of an oil metering apparatus according to the invention.

Referring to FIG. 1-8, there is shown an oil metering apparatus according to the invention. The apparatus includes an oil reservoir 20 which is hollow in construction. The reservoir 20 can have an open neck portion 22 through which oil can be supplied to the reservoir after removal of a fill cap 24. Outlet structure is provided to dispense oil from the reservoir 20. The outlet structure preferably includes a conduit member 28 having a first opening 32 which communicates with the interior of the reservoir 20. A second opening 36 communicates with the exterior of the reservoir 20, preferably below the reservoir 20. Oil flowing through the first opening 32 passes through the hollow core 40 of the conduit member 28 and can flow outward under the force of gravity through the second opening 36. The conduit member 28 is slidably mounted through reservoir 20. Preferably a closed end of the conduit member 28 extends through the top of the reservoir 20 to permit the user to grasp and manipulate the conduit member 28 with respect to the reservoir 20. A tube 42 can be joined to the conduit member 28 to pass the oil directly to the engine. The tube 42 can have flange structure 44 which can engage lip structure 48 on the conduit member 28. Other engagement means could alternatively be used.

Figure 2:
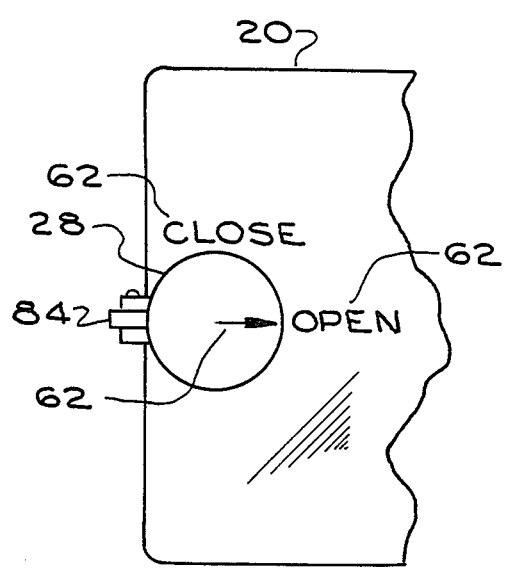
FIG. 2 is a plan view of a portion of an oil metering apparatus according to the invention.
Figure 4:
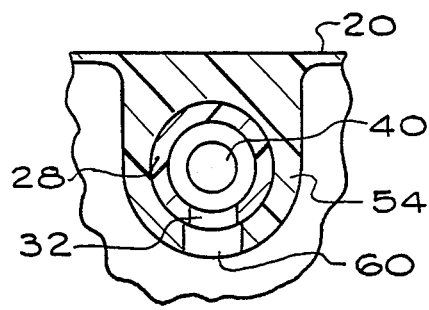
FIG. 4 is a cross-section taken along line 4—4 in FIG. 3.
Figure 7:
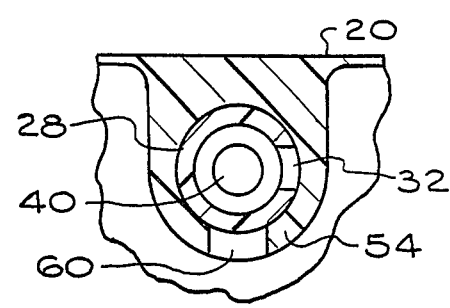
FIG. 7 is a cross-section taken along line 7—7 in FIG. 6.
Figure 6:
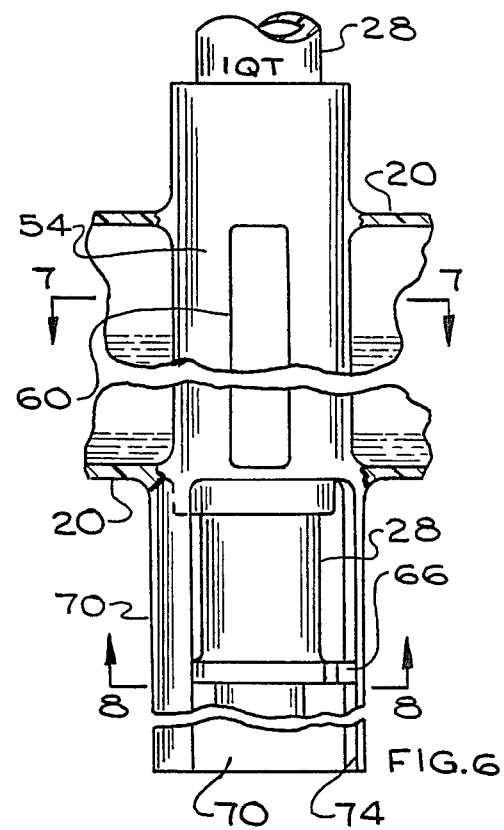
FIG. 6 is a cross-section taken along line 3—3 in FIG. 1, showing an alternative position of a conduit member with respect to the housing.
Figure 5:
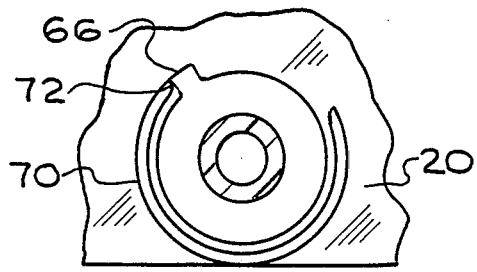
FIG. 5 is a cross-section taken along line 5—5 in FIG. 3.
Figure 8:
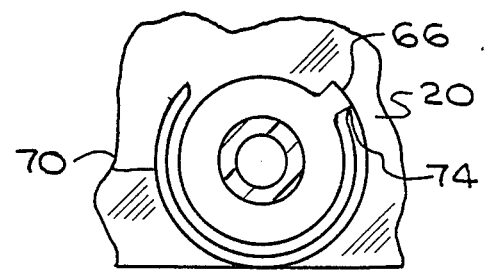
FIG. 8 is a cross-section taken along line 8—8 in FIG. 6.

It is desirable to close the outlet structure to prevent unwanted leakage from the reservoir 20, particularly when the motor vehicle is in motion. This can be conveniently accomplished by suitable valve means. In a preferable valve structure, the conduit member 28 is snugly nested with a housing, one inside the other. In a preferred embodiment, the conduit member 28 is tubular in construction and nests within a substantially tubular housing 54. The conduit member 28 preferably is axially slidable and radially pivotable with respect to the housing 54. In one radial position of the conduit member 28 with respect to the housing 54, the first opening 32 aligns with a longitudinal opening 60 in the housing 54 (FIGS. 4–5). Oil can then flow through the first opening 32, the hollow core 40 of the conduit member 28, and out of the reservoir through the second opening 36. In a second radial position of the conduit member 28 with respect to the housing 54, the first opening 32 abuts a portion of the housing 54 (FIGS. 6–8). The first opening 32 is thereby sealed, and oil flow or leakage is prevented. Indicia 62 can be provided on the reservoir 20 and the conduit member 28 to assist the user in finding the open and closed positions of the first opening 32 (FIG. 2).

Figure 3:
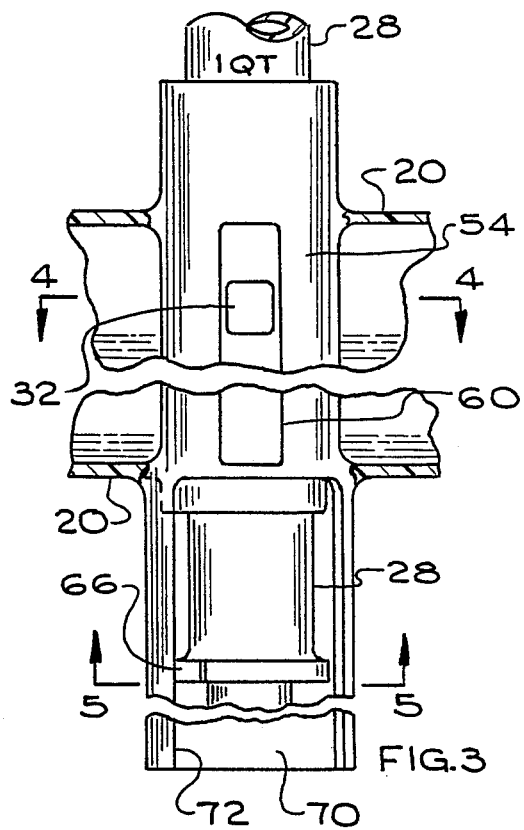
FIG. 3 is a cross-section taken along line 3—3 in FIG. 1.

It is desirable to provide structure which will positively position the first opening 32 in the closed and open positions. A stop 66 can be provided on the conduit member 28 below the level of the reservoir 20. A sleeve 70 can depend from the housing 54 or the reservoir 20 to partially surround the conduit member 28. The stop 66 contacts a first edge 72 of the sleeve 70 to align the first opening 32 with the opening 60 in the housing 54 (FIGS. 3–5). In a second radial position of the conduit member 28, the stop 66 contacts a second edge 74 of the sleeve 70 to align the first opening 32 in a position where it abuts a portion of the housing 54 (FIGS. 6–8).

It is desirable to form a fluid tight seal between the conduit member 28 and the reservoir 20. This can be accomplished by appropriate seal structure. O-rings 78 and 80 are shown as sealing the conduit member 28 at the bottom and top halves of the reservoir 20, respectively. Other seal structure could alternatively be used.

Oil is supplied to the engine by lowering the conduit member 28 through the reservoir 20 to lower the level of the first opening 32 below the oil level. The conduit member 28 can then be rotated to align the first opening 32 with the opening 60 in the housing 54 to permit oil to flow to the engine through the tube 42. A flip-up cam lock 84 or other suitable locking structure can be provided to engage the conduit member 28 and retain it in a desired position relative to the reservoir.

The amount of oil that is dispensed will depend upon the vertical position of the first opening 32 relative to the oil level in the reservoir 20. The conduit member 28 is axially displaceable with respect to the housing 54 and the reservoir 20, and therefore the first opening 32 can be lowered with respect to the oil in the reservoir 20 to deliver oil to the engine.

Metering structure is provided to release a predetermined amount of oil. Gradations are preferably provided on the conduit member 28 to indicate the position of the first opening 32 within the reservoir 20, and thus the amount of oil that has been dispensed or will be dispensed. The gradations also provide an indication of the amount of oil that is left in the reservoir 20. Gradations 86 can be provided on the conduit member 28 as numerical figures and as horizontal reference lines. The amount of oil that is supplied to the engine can thereby be metered with reasonable accuracy. The gradations are preferably made to indicate standard units of measure, such as the quart as shown. The gradations 90 on the reservoir 20 indicate the amount of oil that remains in the reservoir 20, as the oil level can be seen through a translucent reservoir material.

Figure 10:
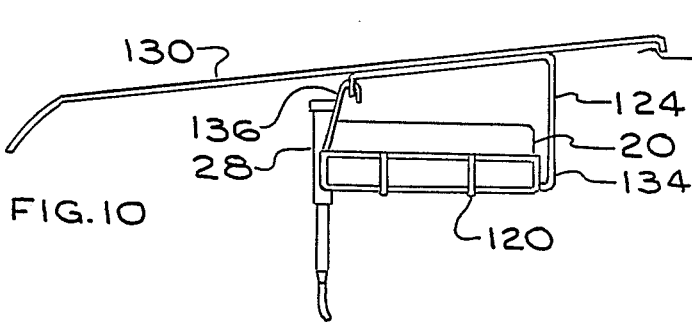
FIG. 10 is a side elevation of an oil metering apparatus mounted in a first position beneath a lowered motor vehicle hood.
Figure 9:
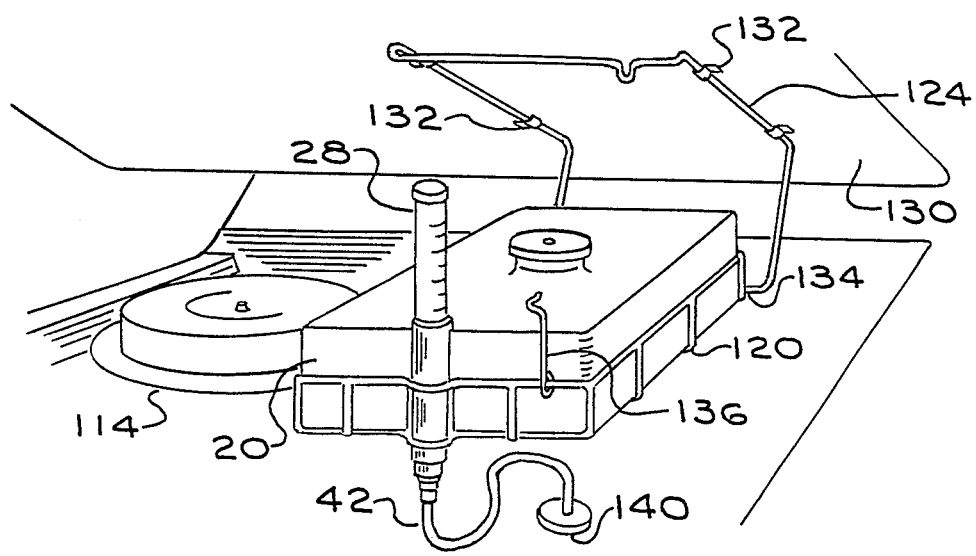
FIG. 9 is a perspective view of an oil metering apparatus according to the invention mounted beneath a raised motor vehicle hood.

It is desirable to mount the oil metering apparatus of the invention directly above the engine. This can be accomplished by mounting structure according to the invention (FIGS. 9-12). The mounting structure is preferably a frame structure which includes a reservoir engagement portion 120 which can be a basket fitted to the reservoir 20. A hood bracket 124 can be fixed to the underside of the motor vehicle hood 130 by suitable means such as straps 132. The hood bracket 124 is hinged to the reservoir retaining portion 120 to allow the reservoir 20 to pivot with respect to the motor vehicle hood 130. The reservoir engagement portion 120 can be pivoted upward through the action of a hinge means 134 between the hood bracket 124 and the reservoir engagement portion 120 to rest snugly beneath the closed hood (FIG. 10). Fastening means such as a fastening hook 136 can be used to engage the reservoir retaining portion 120 to the hood bracket 124 in the closed position.

Figure 11:
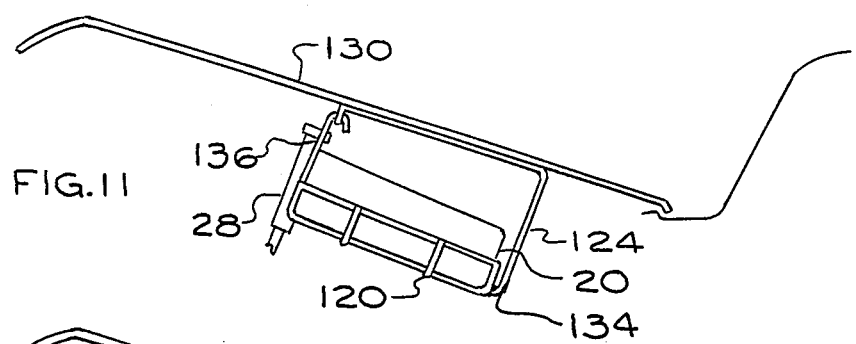
FIG. 11 is a side elevation of an oil metering apparatus mounted in a first position underneath a raised motor vehicle hood.
Figure 12:
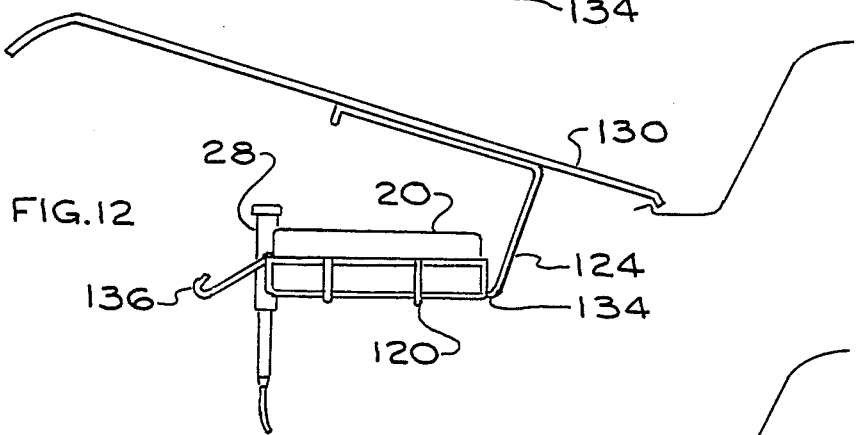
FIG. 12 is a side elevation of an oil metering apparatus mounted in a second position underneath a raised motor vehicle hood.

The reservoir 20 will be angled when the hood is raised, making accurate metering difficult. The conduit member 28 is also difficult to manipulate because of its proximity to the hood 130 (FIG. 11). The hinge means 134 between the reservoir retaining portion 120 and the hood bracket 124 permits the reservoir 20 to pivot to a relatively level position where metering can be performed more accurately and where the apparatus can be reached more easily. Oil is supplied from the reservoir 20 through the flexible tube 42 directly to the engine 114. The flexible conduit 42 can engage an appropriate cap 140 which covers the oil fill opening of the engine. The cap 140 has an opening therethrough to allow oil to pass directly from the flexible tube 42 to the engine 114.

This invention can be embodied in other forms without departing from the spirit or essential attributes thereof, and accordingly, reference should be made to the following claims, rather than to the foregoing specification, as indicating the scope of the invention.

I claim:

1. A fluid metering apparatus, comprising:
a fluid reservoir;
outlet structure comprising a conduit member having a first opening communicating with the interior of the reservoir and a second opening communicating with the exterior of the reservoir, the first opening being selectively positionable in the reservoir to dispense fluid through the second opening of the conduit member;
the conduit member being slidably mounted through the reservoir, a closed end of the conduit member extending through the top of the reservoir, and an open end defining the second opening extending below the reservoir.

2. The fluid metering apparatus of claim 1, further comprising valve means for controlling the flow of fluid through the outlet structure.

3. The fluid metering apparatus of claim 1, further comprising tube means for fluid connection between the second opening and an engine.

4. The fluid metering apparatus of claim 1, further comprising a fitting adapted to connect an end of the tube means directly to the oil-fill opening of an engine, whereby oil dispensed from the apparatus will be conveyed directly to the engine.

5. The fluid metering apparatus of claim 1, further comprising means for mounting the apparatus to a hood of a motor vehicle.

6. The fluid metering apparatus of claim 5, wherein the mounting means comprises a reservoir retaining portion and a hood mounting portion joined at an edge by hinge means, and fastening means for retaining the reservoir retaining portion in a pivotal position relative to the hood mounting portion such that the reservoir rests in close proximity to the hood of the motor vehicle, whereby the reservoir can be latched in close proximity of the hood for convenient storage, and pivoted downward when unlatched to level the reservoir and to provide ready access to the conduit member.

7. The fluid metering apparatus of claim 1, further comprising metering means for controlling the amount of fluid that is dispensed from the reservoir.

8. The fluid metering apparatus of claim 7, wherein the metering means comprises gradations on at least one of the conduit member and the reservoir, whereby the user can visually determine the amount of fluid which will be dispensed from the reservoir for a given position of the first opening with respect to the fluid level in the reservoir.

9. The fluid metering apparatus of claim 8, further comprising indicia for determining the amount of fluid remaining in the reservoir.

10. The fluid metering apparatus of claim 1, further comprising a housing fixed to the reservoir and nesting snugly with the conduit member, one inside the other, the conduit member being axially slidable and radially pivotable with respect to the housing, whereby in a first radial position of the conduit member with respect to the housing, the first opening communicates with the interior of the reservoir and fluid flow through the conduit member is possible, and in a second position of the conduit member with respect to the housing, the first opening abuts a portion of the housing to prevent fluid flow therethrough.

11. The fluid metering apparatus of claim 10, wherein the conduit member nest snugly within the housing.

12. The fluid metering apparatus of claim 11, further comprising stop means for limiting the radial range of movement of the conduit member with respect to the housing, such that at one extreme of the range of movement the first opening fully communicates with the interior of the reservoir, and in an opposite extreme of the range of movement the first opening fully abuts a portion of the housing to prevent fluid flow through the first opening.

13. The fluid metering apparatus of claim 12, wherein the stop means comprise a raised contact surface on the conduit member, and stop surfaces fixed to the reservoir and adapted to contact the raised contact surface on the conduit member at either extreme of the range of movement.

14. The fluid metering apparatus of claim 13, wherein the two contact surfaces fixed to the reservoir represent opposite edges of a semi-cylindrical sleeve.

15. The fluid metering apparatus of claim 14, wherein the raised contact surface on the conduit member is provided on the portion of the conduit member below the reservoir, and the sleeve is fixed to the exterior of the reservoir so as to partially encircle the conduit member below the reservoir.

* * * * *